United States Patent

[11] 3,598,079

| [72] | Inventor | Marvin A. Cudley<br>9465 Emmet, Omaha, Nebr. 68134 |
|---|---|---|
| [21] | Appl. No. | 863,961 |
| [22] | Filed | Oct. 6, 1969 |
| [45] | Patented | Aug. 10, 1971 |

[54] BOAT STEERING SYSTEM
12 Claims, 9 Drawing Figs.

[52] U.S. Cl. .................................................. 114/153
[51] Int. Cl. .................................................. B63h 21/26
[50] Field of Search ........................................ 114/146,
153, 160; 115/18; 74/480 B, 512

[56] References Cited
UNITED STATES PATENTS
2,514,487  7/1950  Black ............................ 114/146 X

| 2,878,768 | 3/1959 | Warblow...................... | 114/153 |
| 3,002,398 | 10/1961 | Beamer......................... | 115/18 X |
| 3,007,429 | 11/1961 | Sandman....................... | 114/160 |

*Primary Examiner*—Andrew H. Farrell
*Attorney*—Hiram A. Sturges

ABSTRACT: A boat having a steering system comprising a steering member such as the handle of an outboard motor, a foot pedal disposed in a portion of the boat forwardly of the steering member, the upper portion of the foot pedal being movable forwardly and rearwardly of the boat and a pulley and cable system interconnecting the pedal and steering member in a manner such that as the upper portion of the pedal is moved forwardly or rearwardly, the steering member is moved toward one side or the other of said boat.

PATENTED AUG 10 1971 3,598,079

INVENTOR.
MARVIN A. CUDLEY
BY

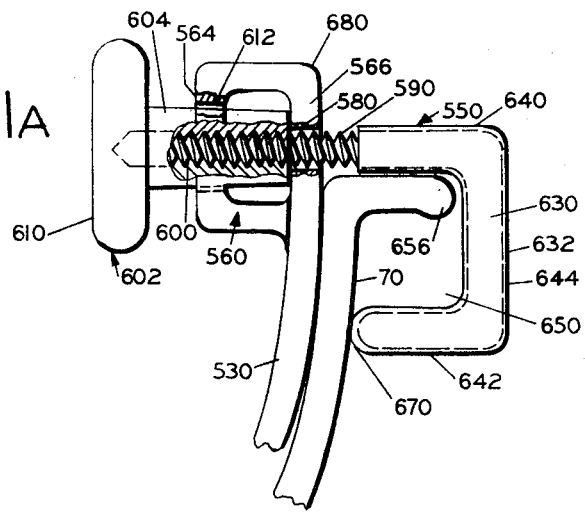
FIG. 1A
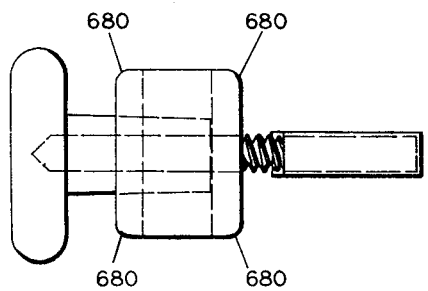
FIG. 2A
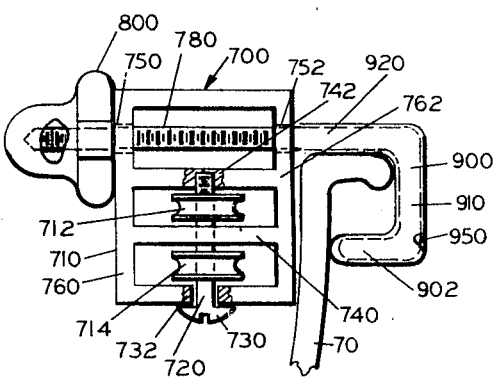
FIG. 3A
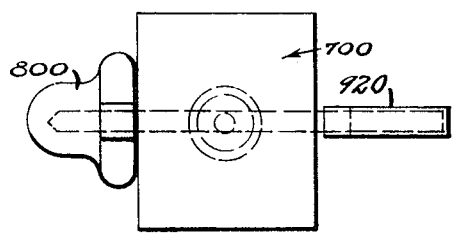
FIG. 4A
INVENTOR.
MARVIN A. CUDLEY
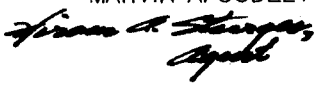

PATENTED AUG 10 1971

INVENTOR.
MARVIN A. CUDLEY

BY *Hiram A. Sturges*
  *Agent*

3,598,079

BOAT STEERING SYSTEM

FIELD OF THE INVENTION

This invention is in the field of boat steering systems and particularly those in which steering is accomplished by means of the feet.

DESCRIPTION OF THE PRIOR ART

Prior art boat steering systems have generally not been adapted to be operated with one foot. As a consequence, they have been more expensive, since they have required two foot pedals.

In marketing a steering system, it is necessary that it fit a large number of boats. Many of the boats today are made of either metal or plastic. They do not lend themselves well to the insertion of screws. As a consequence, boat steering systems of the prior art would not fit mass sales for mounting on boats of the types now in most common use.

SUMMARY OF THE INVENTION

A boat having a steering system comprising a steering member such as the handle of an outboard motor, a foot pedal disposed in a portion of the boat forwardly of the steering member, the upper portion of the foot pedal being movable forwardly and rearwardly of the boat and a pulley and cable system interconnecting the pedal and steering member in a manner such that as the upper portion of the pedal is moved forwardly or rearwardly, the steering member is moved toward one side or the other or said boat.

The pulley system comprising a forward pulley disposed forwardly of the foot pedal, a pair of rearward pulley means disposed rearwardly of the foot pedal and to one side of the steering member, a reversing pulley means disposed on the opposite side of the steering member from the pair of pulley means, means for securing each of the pulley means to the boat, a first cable extending from an upper part of the foot pedal forwardly through the forward pulley means and from there rearwardly around one of the pulley means of the pair and from there extending to an attachment to the steering member, a second cable extending from the upper portion of the foot pedal to which it is connected rearwardly around the other one of the pulleys of the pair and from there extending around the reversing pulley means and from there extending to an attachment to the steering member.

The said means for attaching the foot pedal and the pulley means to said boat comprising bracket means extending across the upper edge of said boat and downwardly on both the inner and outer sides of the gunwale of said boat, clamping means being mounted on the bracket means for firmly clamping said bracket means to said gunwale, two of said bracket means being disposed on the same side of said boat, a connecting means interconnecting lower ends of said two bracket means, said pedal being mounted on the upper side of said connecting means, means mounting said pedal on said connecting means in a manner for the movement of the upper end of said pedal forwardly and rearwardly with respect to said boat.

The mounting means for said pedal being specifically a hinge connected to the lower portion of said pedal and to said connecting means, said means attaching said foot pedal to said connecting member being adjustable forwardly and rearwardly along said connecting member to adapt to various operators having legs of different lengths, said foot pedal having means thereon and attached thereto for engaging the upper side of the operator's foot so that as the operator moves his foot rearwardly, steering is accomplished effectively, said means extending across the rearward side of the operator's foot specifically being a concave flexible member which is concave on its inner side whereby its concavity renders it more comfortable to receive the pressure of the foot, means mounting said concave inner surfaced member on said foot pedal in an adjustable manner so that a position can be adjusted to the length of a foot of an operator, means on said foot pedal for supporting the heel of an operator and said heel supporting means extending outwardly from and rearwardly from a lower portion of said pedal so as to engage the rearward side of an operator's heel.

BRIEF DESCRIPTION OF THE DRAWING

FIG. 1a is a rear elevation of the modified gunwale attachment assembly shown on the upper end of an upright portion of a bracket assembly, lower parts of the latter end of the gunwale being broken away, and certain parts of this assembly being broken away and other parts showing in section.

FIG. 2a is a top plan view of the gunwale attachment assembly of FIG. 1a, but without the gunwale shown therein.

FIG. 3a is a rear elevation of a tandem pulley bracket assembly of modified form from that shown in FIG. 5 and shown as attached to a section of a gunwale.

FIG. 4a is a top plan view of the parts shown in FIG. 3a, but with the gunwale removed.

DESCRIPTION OF THE PREFERRED EMBODIMENT

Figure 1:
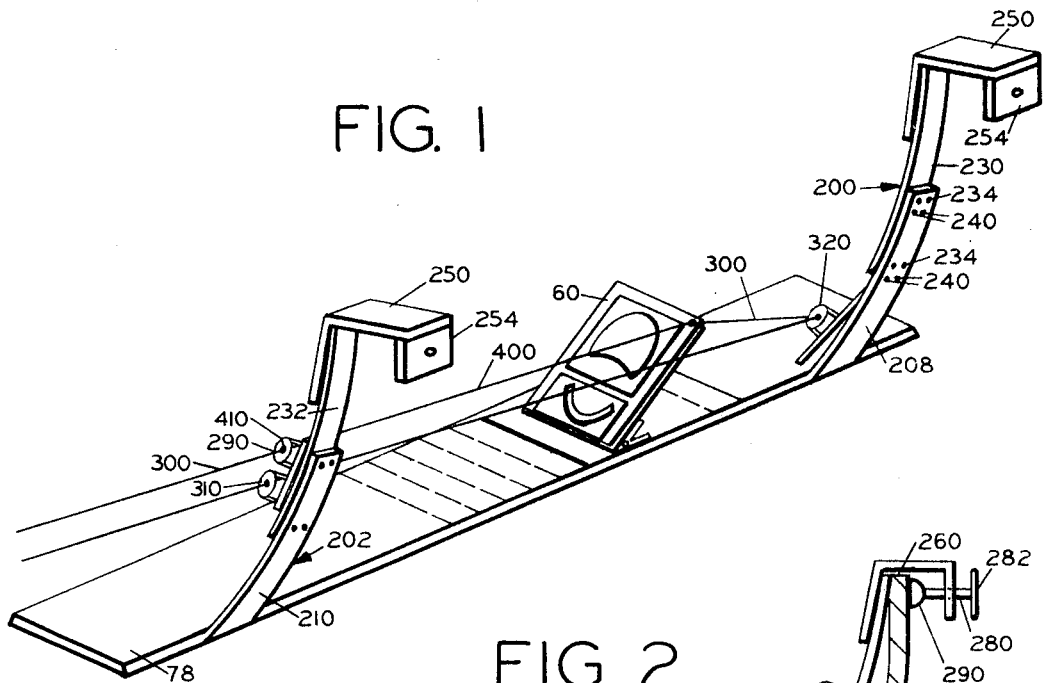
FIG. 1 is a perspective view taken on one side and looking forwardly of the foot pedal and mounting bracket assembly of the invention.

The steering system of this invention is generally described at 10 in FIG. 1 and is adapted for mounting on a boat generally shown at 12, the boat being one of a type having its upper side open whereby the steering system of this invention is particularly adapted for rapid assembly thereon.

Figure 4:
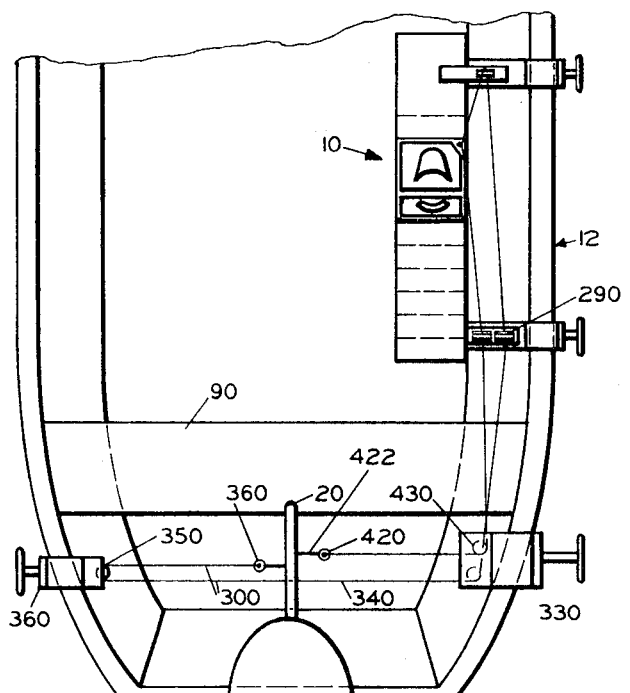
FIG. 4 is a top plan view of the boat with its rearward end only being shown, and with the steering system of this invention mounted thereon.
Figure 5:
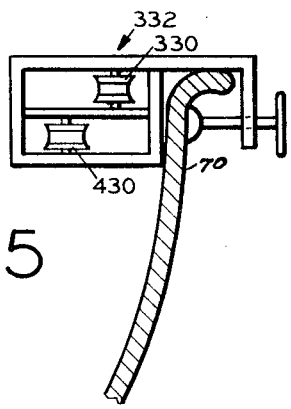
FIG. 5 is a detail showing a pair of pulley means of a pulley pair assembly attached to the gunwale of a boat, the gunwale being shown in vertical section.

Referring now to FIG. 4, it will be seen that the boat has a steering member 20 which is adapted to be moved to the port or starboard sides of the boat respectively for controlling the steering of the boat.

In most uses of the steering system of this invention, the steering member 20 will be a handle of an outboard motor 40 or perhaps an extension of a handle of such an outboard motor.

Figure 3:
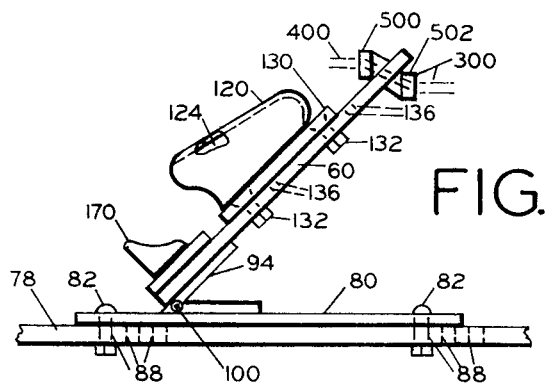
FIG. 3 is a side elevation in detail showing the foot pedal and a portion of the connecting member area of the invention.

The steering system 10 as a foot pedal 60 which can be seen in detail in FIG. 3, the foot pedal being disposed forwardly of the steering member 20 a substantial distance and preferably being disposed toward one side of the center line of the boat. Still more preferably, the foot pedal is disposed as far out of the way as possible, allowing movement back and forth in the boat, and for that purpose, the foot pedal is placed at the bottom of the gunwale 70 of the boat on one side thereof, although preferably in a position such that it is above a substantially flat bottom portion 72 of the boat.

The foot pedal 60 is disposed above a connecting member 78, which latter is horizontally disposed and extends forwardly and rearwardly, being elongated. Above the connecting member 78 an attachment member 80 is mounted thereon by means of bolts 82, which latter are adapted to be disposed through any one of a plurality of openings 88, which latter are in pairs disposed forwardly and rearwardly of each other so that the attachment member 80 can be mounted either in a more forward or a more rearward position to adjust its position to the length of an operator's leg.

Referring to FIG. 4, it will be seen that the back seat of a boat shown at 90 may vary from boat to boat in its position forwardly and rearwardly in the boat so that many adjustment openings 88 are preferred to permit desired leg length adjustment.

Referring now to FIG. 3, it will be seen that the foot pedal 60 is attached to the member 80 by means of a hinge 94 which is disposed on a lower portion of the pedal at its forward side, the hinge 94 being suitably connected to the pedal 60 and to the member 80 and having an axis 100 extending horizontally and transversely of the boat.

Above the forward portion of the foot pedal an engaging member 120 is provided for engaging the upper side of the forward portion of the operator's foot. The engaging member 120 has a cavity 124 therein which opens to the rear of the member 120 so that the operator's foot can be shoved up into the member 120, which latter is preferably made of flexible material such as rubber for the comfort of the operator, especially in the event that the operator desires to use the device with bare feet.

The engaging member 120 is suitably attached to a bridge member 130, which latter is bolted by bolts 132 to the pedal 60, the bolts 132 extending through selected ones of many openings 136 which are disposed forwardly and rearwardly along the pedal 60 so that the forward and rearward position of the engaging member 120 can be adjusted to the length of the operator's leg and so that it is at various and suitable distance from a heel-engaging member 170, which latter is suitably attached to the pedal 60 and extends upwardly from the rearwardmost portion of the pedal and is provided with a concave forward side 174 for receiving the operator's heel.

The connecting member 78 is held in position by means of a forward bracket assembly 200 and a rearward bracket assembly 202, each of the assemblies has a lower bracket portion 208 and 210 respectively attached to the forward and rearward ends of the connecting member 78 respectively with the upper portion of each bracket assembly 200 and 202 being formed by a first upright portion 230 and 232 respectively attached by bolts 234. The upright portions 230 and 232 of the brackets are attached by the bolts 234 to the lower bracket portions 208 and 210.

The bolts 234 can be adjustably positioned in various bolt holes 240 spaced upwardly and downwardly of each other respectively so as to be able to adjust the vertical length of the bracket assemblies 200 and 202 so that when the connecting member 78 is on the floor, U-shaped upper portions 250 of the brackets are disposable so that they rest on or closely to the upper edge of the gunwale, which latter is seen at 260. Each U-shaped upper portion 250 has downwardly extending outer end 254 disposed on the outer side of the gunwale 70 and through which a threaded shaft 280 of a clamping assembly 282 is provided for clamping the U-shaped upper portion 250 to the boat by having portions 290 on the inner ends of the shaft 280 press against the outer side of the boat in the manner of a common "C"-clamp.

Referring now to FIG. 1, it will be seen that a first cable 300 extends from an attachment to the upper outer corner of the pedal 60 forwardly through a forward pulley device 320 and then rearwardly past the pedal 60 until it passes through a guide eyelet 290 mounted on the rearward one of the pair of brackets 200 and 202. The first cable 300 passing through the eyelet 310 and extending around a first pulley 330 of a pair of pulleys generally indicated 332 and then extends across the boat transversely, as shown at 340.

The first cable 300 extends across the boat and around a reversing pulley 350 mounted on the opposite side of the boat from the pulley 330, the pulley 350 being clamped to the gunwale of the boat by a C-clamp 360. The pulley 350 rotates about a vertical axis and the first cable 300 having extended around the pulley 350 then extends back in to a point of connection with a connecting means 360 which connects the cable 300 to the steering member 20.

A second cable 400 is attached at its forward end to the upper outside corner of the foot pedal 60 and extends rearwardly through an upper eyelet 410 mounted on the rearward bracket 202 and from there the second cable 400 extends around a rearward pulley 430 of the pair of pulleys 330 and 430 of the pulley assembly 332, from the pulley 430 the cable 400 extends inwardly of the boat to a point of connection 420 with an attachment means 422, which latter attaches the cable to the steering member 20.

The pulley 430 and the pulley 330 both rotate about vertical axes. The pulleys 320 and the guide pulleys 310 and 410 can all be eyelets having very smooth sidewalls rather than conventional wheel pulleys, if desired, since in either sense, all of these function as pulleys and can be called pulleys in the meaning of this application.

Referring to FIG. 3, it will be seen that the cables 400 and 300 can be the same cable, if desired, but held on each side of the foot pedal 60 by clamp means 500 and 502 respectively.

As thus described, all an operator need do to steer the boat is to sit on the seat 90 in a normal manner, free to use hands for fishing or other activities, while one of his feet is in the position for controlling the pedal 60. Pushing the top of the pedal 60 forward or pulling it back will easily control the steering of the boat, leaving his hands free, and all accomplished with a single pedal and with the commercial economies of having a single pedal for steering.

The many adjustments make possible the adaptation of the steering system to boats of varying sizes and having varying sizes of sides or gunwales.

Referring to FIG. 1a, a modified gunwale attachment assembly is there shown at 550, being a substitute for the gunwale attachment assembly shown at 250 in FIG. 1.

The attachment assembly 550 has a frame portion generally indicated at 560 which is mounted on the upper end of an upright 530 which is a modified form of the upright 230 of FIG. 1.

The frame portion 560 consists of what is essentially a rectangular-shaped configuration, as seen in rear elevation in FIG. 1a, the frame 560 being attached to and perhaps partly on one piece with the upright 530.

The frame 560 has tow spaced upright frame portions 564 and 566, which latter are spaced various distances from the gunwale 70.

The upright frame portion 566 has an opening 580 extending therethrough in a direction transversely of the boat and of the elongation of the gunwale 70 for receiving a threaded shaft 590 therethrough in a freely sliding fashion.

The threaded shaft 590 can extend on inwardly of the boat through the frame 560 and its inner end is threadedly received in a threaded recess 600 in a knob 602.

The knob 602 has a shank portion 604 in which the threaded recess 600 is disposed and has an enlarged inner end 610 for purposes of easy gripping by the hand of the operator and having blunt surfaces gradually curved so that if it is struck by a boatman while accidentally falling, it will do a minimum of damage.

The shank portion 604 is freely rotatable within an opening 612 which extends horizontally through the innermost upright section 564 of the frame 560.

The outer end of the threaded shaft 590 is connected to a hook 630, which latter is covered with a coating of rubber 632 for minimum damage to the boat.

The hook 630 has an upper portion 640 extending horizontally, a lower portion 642 which likewise has a considerable horizontal dimension, and a connecting portion 644 connecting the portions 640 and 642, whereby the hook 630 has a recess 650 for receiving therein an outwardly extending flange 656 of the gunwale of the boat, with the lowermost horizontal portion 642 of the hook having a blunt inner rubber covered surface 670 for engaging the side of the boat.

Referring to FIG. 1a, it will be seen that the gunwale attachment assembly there shown is attached to the gunwale 70 by simply rotating the knob 602 until the threaded shaft 590 s drawn therein so that the blunt end 670 presses firmly against the side of the boat for anchoring the upright 530.

Figure 2:
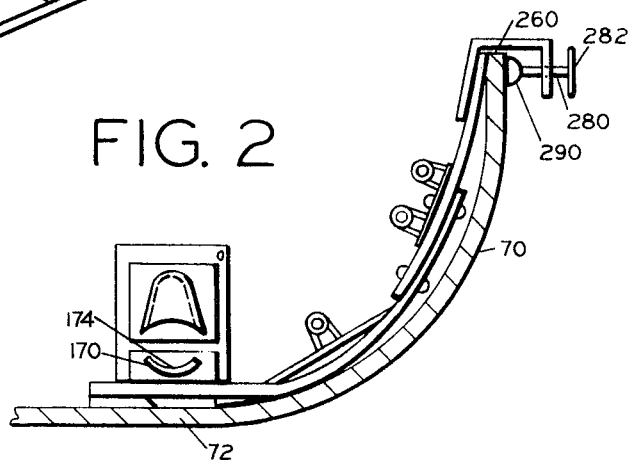
FIG. 2 is a rear elevation of the parts shown in FIG. 1 with a portion of the boat being shown in cross section.

Referring to FIG. 2a, it will be seen that even in top plan view, the various corners and edges of the frame 560 are rounded for minimum damage to anyone falling against them.

Referring to FIG. 3a, the tandem pulley there shown at 700 is seen to have a frame 710 in which two horizontal pulleys 712 and 714 are disposed, one above another, on the same axle bolt 720, which latter has a head 730 on the lower side of the frame and extends upwardly through an opening 732 in the frame, through the lower pulley 714, through an intermediate member 740, and is threaded received in an inner frame member 742 disposed upwardly from and close to the upper pulley 712.

The frame 700 has openings 750 and 752 in certain inner and outer upright sides 760 and 762 thereof for receiving a threaded shaft 780 therethrough in a freely sliding fashion and a knob 800 receives the inner end of the shaft 780 and has rounded exposed surfaces for minimum damage to an operator falling against the knob.

The knob 800 engages the frame inner side portion 760 for pulling the shaft 780 inwardly of the boat to draw a hook 900 inwardly so that its lower portion 902 engages the sidewall or gunwale 70 of the boat while an intermediate and upright portion 910 extends upwardly to and is attached to an upper portion 920 of the hook, all parts of the hook being preferably covered with rubber coating, as seen at 950 to protect the boat.

I Claim

1. A boat steering system comprising a boat, said boat having a steering member disposed in a rearward portion thereof and adapted to be moved to port or starboard to steer the boat, a foot pedal disposed in a portion of said boat which is forwardly of said steering member a substantial distance, means for mounting said foot pedal movably on said boat in a manner such that the upper end of said pedal is movable forward and aft, a forward pulley means disposed forwardly of said pedal, a pair of rearward pulley means disposed in said boat rearwardly of said pedal and to one side of said steering member, a reversing pulley means disposed on the opposite side of said steering member from said pair of pulley means, means for securing each of said pulley means to said boat, a first cable extending from an upper part of said foot pedal forwardly to and through said forward pulley means and from there extending rearwardly around one of said pulley means of said pair and from there extending to said steering member and there being connected to said steering member, a second cable extending from said upper portion of said foot pedal to which latter it is connected rearwardly around the other one of the pulleys of said pair and from there extending around said reversing pulley means and from there extending to said steering member to which latter is there connected whereby upon the movement of said foot pedal forward and aft at its upper end said steering member shall thereby be moved to one side or the other of said boat.

2. The boat of claim 1 in which means for mounting said foot pedal comprises a connecting member disposed beneath said foot pedal, means movably mounting said foot pedal with respect to said connecting member for movements of said pedal forwardly and rearwardly at its upper end with respect to said connecting member, and means for attaching said connecting member to said boat.

3. The combination of claim 2 in which said means for mounting said foot pedal on said connecting member is adjustable so that the position of the entire foot pedal with respect to the connecting member can be adjusted for causing this connection to be selectively positioned at a greater or lesser distance forwardly in said boat for adjustment of foot pedal position to operators having various lengths of legs.

4. The combination of claim 2 in which said means for connecting said foot pedal to said connecting member comprises a hinge disposed at the lower side of said foot pedal.

5. The combination of claim 1 in which said means for mounting said pedal on said boat comprises a connecting member disposed beneath said pedal, said pedal being mounted on said connecting member by means permitting the upper part of said pedal to move forwardly and rearwardly with respect to said connecting member, and bracket means attached to said connecting member and extending upwardly therefrom, said bracket means having C-clamp means mounted on its upper end and hooking out over the upper edge of a gunwale of said boat so that said bracket is clamped to said boat firmly.

6. The combination of claim 5 in which said C-clamp means have upper and lower portions overlapping one another, means interconnecting said upper and lower portions of said bracket in a manner for permitting adjustment of said upper and lower portions into positions such that they are overlapped to greater or lesser extents and for fixing said upper and lower portions together in any selected one of said positions for the adjustment of said bracket means to varying heights of the gunwale of the boat.

7. The combination of claim 1 in which said means mounting said rearward pulley means and said reversing pulley means on said boat comprises C-clamps clamped to the respective adjacent gunwales of said boat.

8. The combination of claim 1 in which said foot pedal has an engaging means thereon and on an upper part thereof for engaging the upper side of the forward part of the foot of an operator, said engaging means having space disposed between it and said foot pedal into which an operator's foot forward portion can be received, a heel-engaging means extending rearwardly and upwardly from the lower portion of the rearward side of said pedal and being attached to said pedal for engaging the heel of an operator to support his foot on the pedal 9. The combination of claim 8 in which a bridge member is disposed between said engaging means and said foot pedal, said engaging means being attached to said bridge member, said bridge member being adjustably attached to said foot pedal so as to be positionable in any one of selected positions at various distances from said heel-engaging member for adjustment to feet of various operators.

10. The combination of claim 2 in which a supporting member is provided beneath said foot pedal and on which said foot pedal is movably mounted by suitable means so that its upper end can move forwardly and rearwardly of said boat, said support member being attached to aid connecting member in an adjustable manner so that it can be attached in any one of a plurality of positions both forwardly and rearwardly of each other along said connecting member for adjusting said foot pedal forwardly and rearwardly in said boat to desired positions to accommodate for the differences in length of the legs of an operator.

11. The combination of claim 1 further including a tandem pulley assembly comprising a frame, axle means on said frame rotatably mounting upper and lower horizontally rotating pulleys, said upper and lower pulleys defining the said pair of rearward pulley means above described, a threaded shaft slidably received through said frame, a hook attached to one end of said threaded shaft and hooked over the upper side of the gunwale of said boat, and a knob threadedly receiving the inner end of said threaded shaft and engageable with said frame so that when said knob is rotated, said threaded shaft can be drawn toward said knob for tightening said hook about said gunwale.

12. The combination of claim 1 in which said means for mounting said pedal on said boat comprises a connecting member disposed beneath said pedal, said pedal being mounted on said connecting member by means permitting the upper part of said pedal to move forwardly and rearwardly with respect to said connecting member, an upright bracket means attached to said connecting member and extending upwardly therefrom, a gunwale attachment assembly attached to the upper end of said upright portion of said bracket means, said gunwale attachment assembly comprising: a frame portion, a threaded shaft slidably received through said frame portion and extending transversely of said boat, a hook portion attached to the outer end of said threaded shaft portion and extending downwardly and hooked around the upper portion of the gunwale of said boat, and a threaded knob means threadedly receiving said threaded shaft whereby when said knob means is rotated, said threaded shaft can be drawn inwardly of said boat for tightening said hook about said gunwale.